Nov. 19, 1957 — U. H. RACHNER — 2,813,346
SINE SQUARE
Filed May 15, 1957 — 4 Sheets-Sheet 1
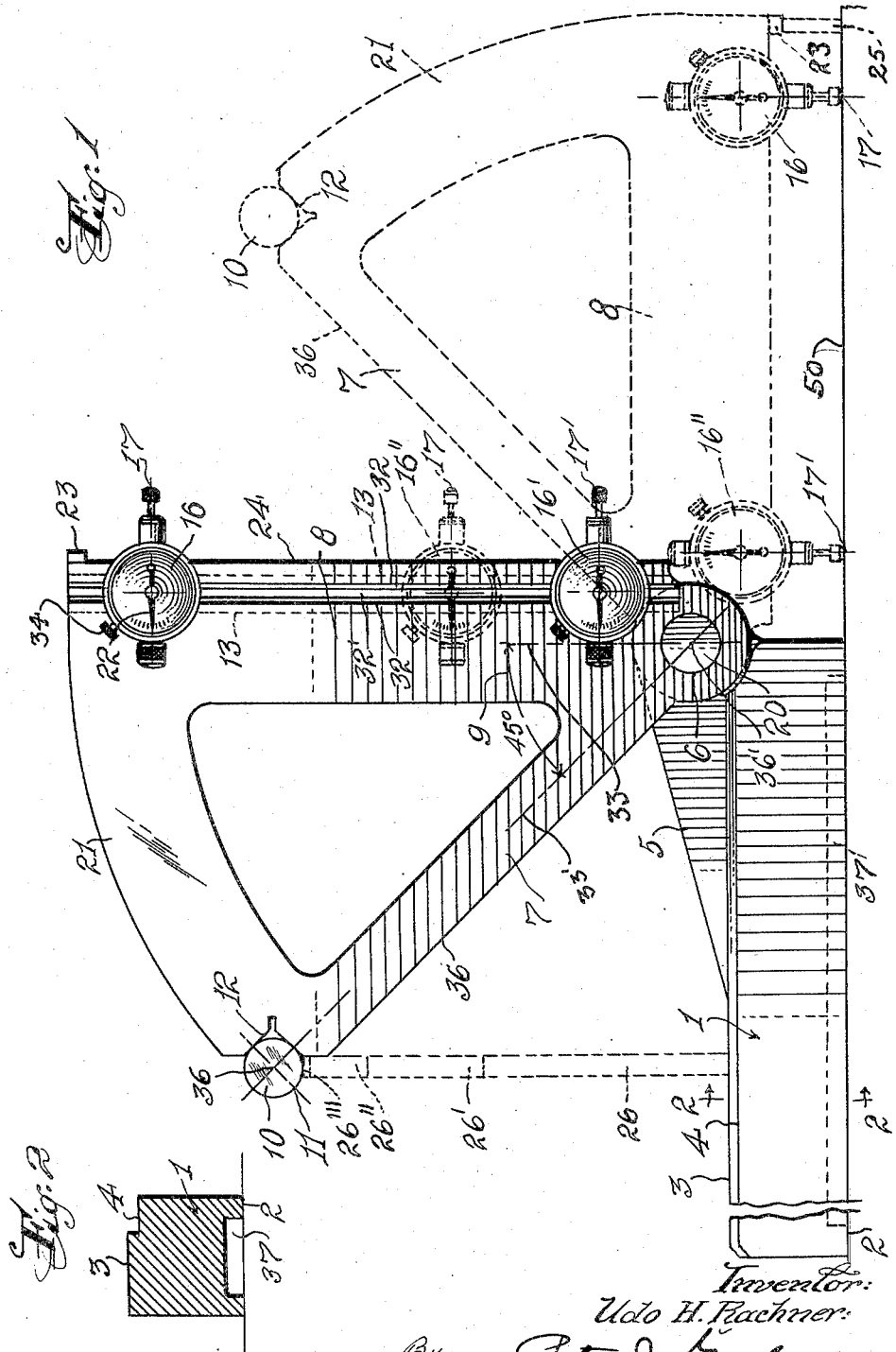

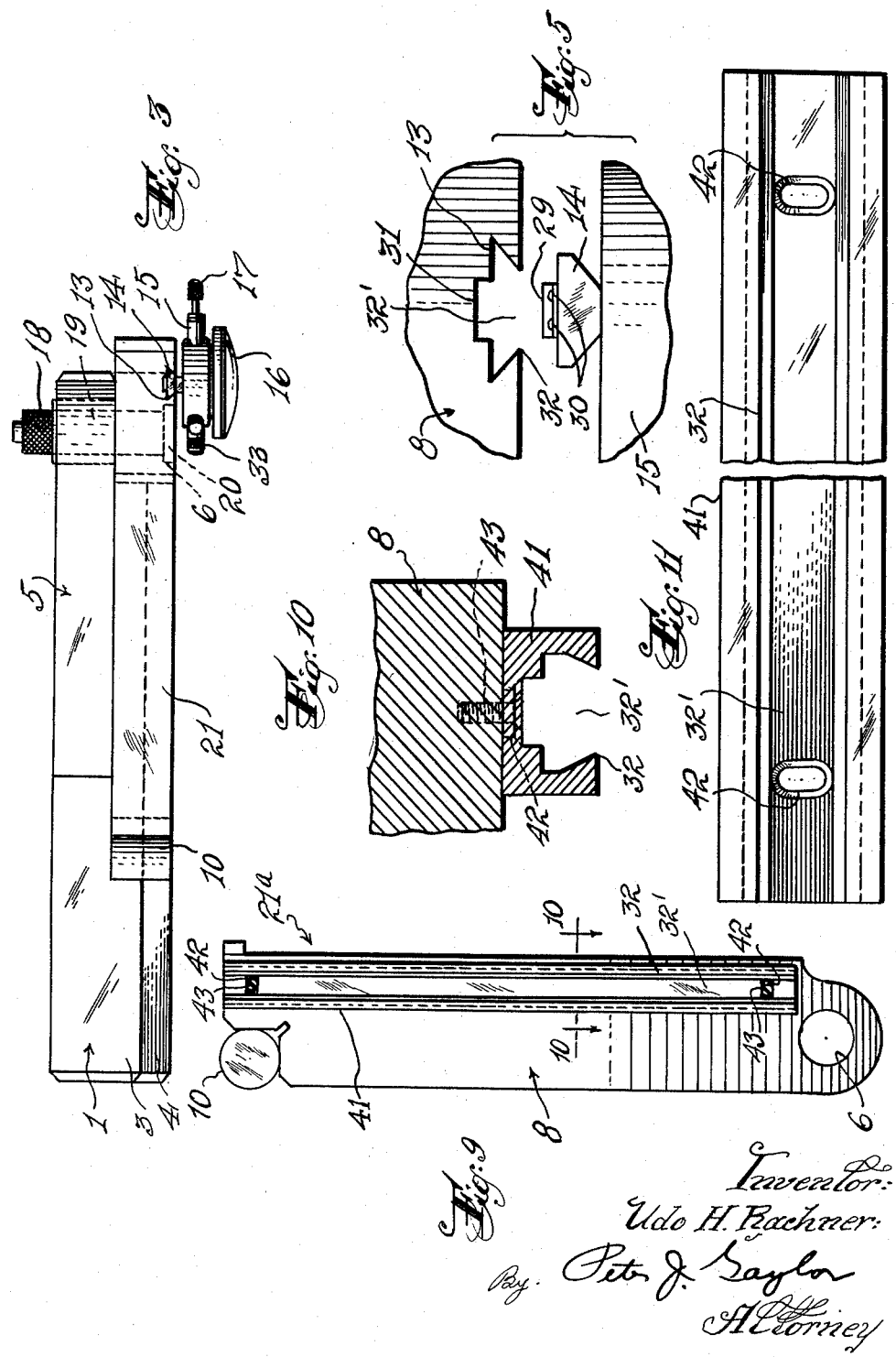

Nov. 19, 1957 U. H. RACHNER 2,813,346
SINE SQUARE
Filed May 15, 1957 4 Sheets-Sheet 3
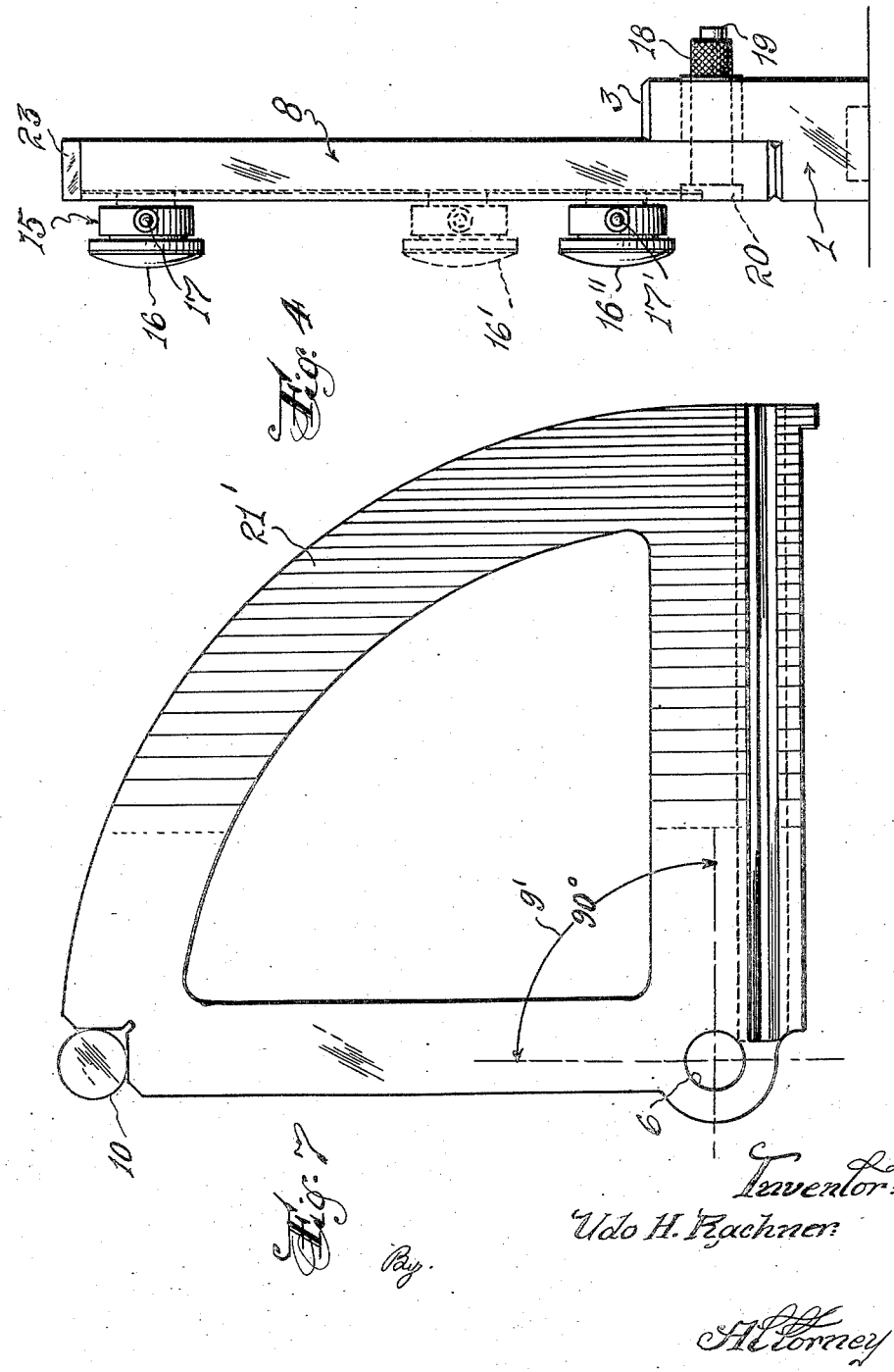

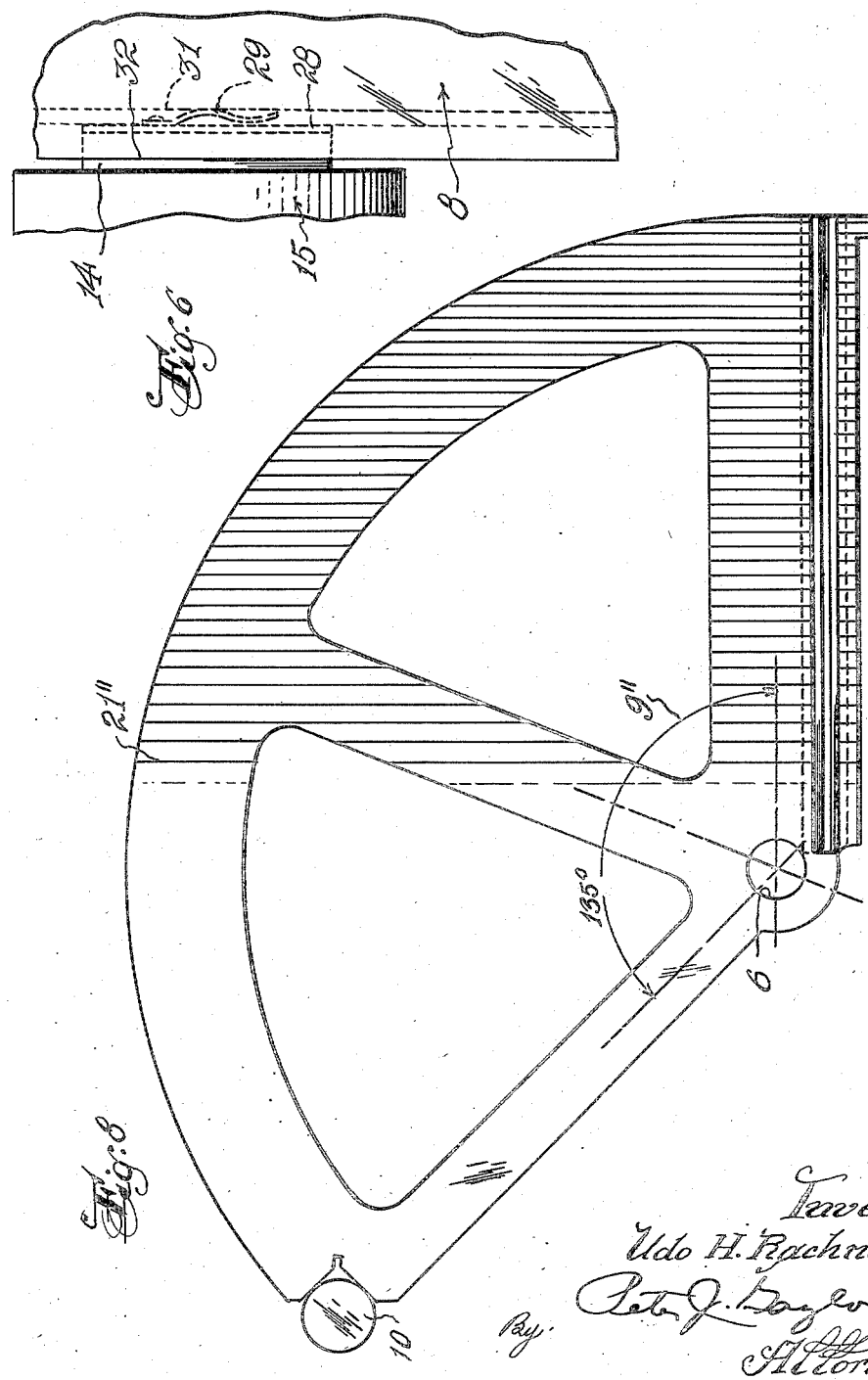

United States Patent Office 2,813,346
Patented Nov. 19, 1957

2,813,346
SINE SQUARE

Udo H. Rachner, Fanwood, N. J.

Application May 15, 1957, Serial No. 659,265

2 Claims. (Cl. 33—174)

This invention deals with a sine square device used for accurately determining working angles in tool manufacturing practice.

Heretofore, sine bars have been used in the shop for determining angles of work-pieces, but they have the disadvantage of making it difficult to measure the angle at different points of the work, particularly when a continuous smooth surface is not available and projections from the measured surface are present. The invention herein described provides a convenient, simple, and relatively inexpensive means for measuring such impeded angle surfaces at any desired point, and enables at least two simultaneous readings of the angle of the work at different points of the work.

The invention will be more readily understood by reference to the accompanying drawings in which a preferred embodiment is illustrated. Figure 1 presents a front view thereof, while Figure 2 shows a cross-section across the base of Figure 1 at 2—2, and Figures 3 and 4 depict top and side views, respectively, of the preferred device. Figure 5 presents an enlarged top fragmental view of the indicator mounting means used in the device of Figure 1, and Figure 6 represents an enlarged fragmental side view of an indicator as it is mounted in said protractor bar holding groove. Figure 7 shows a front view of a 90° protractor arm which may be substituted for the 45° arm in Figure 1, while Figure 8 illustrates a 135° arm which may be similarly employed. A 0° protractor arm having a modified indicator mounting means is depicted in front view in Figure 9, and an enlarged top cross sectional view of a portion of the latter mounting means taken along 10—10 of Figure 9 is illustrated in Figure 10. Figure 11 is an enlarged front view of the indicator mounting means or groove bar attachable to the protractor arm of Figure 9. Similar numerals refer to similar parts in the various figures.

Referring again to the drawings, numeral 1 represents a parallel bar base having parallel lower and upper surfaces 2 and 3, respectively. Portion 37 of bar 1 is hollowed out to make easier the sliding of the bar on a surface plate. Projecting from the right portion of upper edge 3 is flat swivel base 5 having round hole 6 into which is mounted pivot shaft 20 for holding protractor arm 21 in swiveling relation to base bar 1. The protractor arm is provided with an outer protractor bar 8 having a straight edge 24, connected to an inner side 7. Angle 9 made by bar and side centerlines 33 and 33', respectively, of the protractor in Figure 1 is exactly 45°, and facilitates the measurement of work angles of 45° to 90°. The end of inner protractor side 7 has a rectangular cut-out portion 12 into which is fixed cylindrical insert or button 10, the free edge 11 of which extends a little beyond the innermost portion of edge 36 of side 7. Button 10 serves as an accurate measuring surface when used with gage blocks 26, 26', etc., when used in accordance with the well-known sine principle.

The forward surface of protractor bar 8 has a holding or locking groove 32' (which is bounded by parallel edges 32), and into which may be inserted, in one-way restricting relation thereto, complementary tongues 14 of indicators 16 and 16'. These tongues may comprise rearward projections of indicators 16 and 16'. Thus, it is apparent that the only movement afforded tongues 14 is along the long-axis of bar 8 in groove 32'. Tongues 14, which are attached (Fig. 6) to the rear body 15 of indicators 16 or 16' are provided with a thrust spring 29 (attached to the back-surface of tongues 14 by screws 30) which spring impresses sufficient thrust upon the back 31 of groove 32' to enable indicators 16 and 16' to stay in any set position after being slid by hand in groove 32'. Indicators 16 and 16' may be moved to any desired position, such as 16'' (shown by the broken lines in Fig. 1), depending upon the work to be measured. They are provided with rounded protruding measuring tips 17 and 17' disposed at right angles to bar 8 and connected to dial needles 22, as well as with dial tightening screws 34.

Indicators 16 and 16' may be zeroed by swiveling protractor bar 8 into horizontal position, as indicated by the broken lines in Figure 1. Knurled nut 18 is provided to loosen or tighten pivot screw 19 to facilitate the swiveling action. Fastened to the outer end of surface 24 of protractor bar 8 is a flat-faced hardened block 23 adapted to rest on a gage block 25 of exact height, say 1.0000 inch, during the zeroing procedure. The distance between points 36 and 36' of protractor side 7 is exactly the standard distance in machine shop practice, say 10 inches, so that sine tables may be readily used. As is apparent from Figure 1, for the protractor arm shown therein, centerline 33 of bar 8 must be exactly 45° with respect to centerline 33' of protractor side 7. Thus, when bar 8 is in the broken line position shown in Figure 1, the distance from centerline 33 to bar edge 24 plus the length of hardened block 23 and the length of gage block 25 (on surface plate 50) should equal the distance of bottom 2 of base 1 to center 36' of pivot 6. This constitutes the zeroing operation, at which point the dials of indicators 16 and 16' are turned until needles 22 thereof read zero.

When in use, the unit is moved on a surface plate against the edge of the work piece, the angle of which is to be measured. For a 90° setting as shown in Figure 1, a series of gage blocks 26, 26', 26'' is disposed between base bar edge 3 and the outer edge of cylindrical insert 10 for the required distance to give the required 90° of protractor edge 24 with the horizontal. The unit depicted in the drawings will accurately measure angles from 45° to 90°. When the desired angle is adjusted by means of the gage blocks, the unit is pushed against the work surface being measured so that measuring tips 17 and 17' of indicators 16 and 16', respectively, bear upon the work surface, their positions being selected to avoid any protruding obstructions. The readings of indicator needles 22 then will immediately show the extent to which the desired angle had been reached by the machining at the two points measured. It is, of course, possible to employ more than the two indicators shown. Recess 4 provided on the upper edge of base plate 1 is employed when gage blocks 26, 26', etc. under 0.1000" are unavailable, making it necessary to use gage blocks of over 0.1000".

As mentioned previously, protractor arm 21 may be removed by unscrewing nut 18, and other protractor arms having accurate angles may be substituted on base 1 for arm 21, such as protractor arm 21' having an angle 9' of 90° for facilitating measurment of angles of 90° to 135°, or protractor arm 21'' having an angle 9'' of 135° for facilitating measurement of angles of 135° to 180°. The protractor arm of Figure 9 has both sides of protractor arm 21a in bar 8, and can be considered to have an angle of 0°. This arm would facilitate the ready measurement of angular overhangs from the work and would be convenient for measuring angles up to 45°.

Groove 32' need not be exactly parallel to bar edge 24 but, of course, indicators 16 and 16' must be zeroed in the manner already outlined prior to each setting to the work. Groove 32' in the protractor arm of Figure 9 is in a separate groove bar 41 shown in greater detail in Figures 10 and 11, which is attached to bar 8 by screws 43. These screws may be disposed in elongated holes 42, so that groove bar 41 may be moved independently of bar 8 to facilitate further the zeroing of indicators 16 and 16' set in groove 32'. Other means for mounting groove bar 41 to bar 8 in movable relation may be employed, as would be apparent to those skilled in the art. Base bar 1 should be at least as long as protractor side 36.

I claim:

1. A sine square device comprising a parallel bar base, pivot holding means disposed at the upper terminal edge portion of said bar, a pivot mounted in said holding means, an accurate angle protractor removably and swivelly attached at its apex end to said pivot and having a straight edge outer side and an inner side including a terminal end and disposed closer to said base, both said side edges meeting to form the apex end of the protractor, tightening means on said pivot for tightening thereon said protractor, a cylindrical button inserted within the terminal end of said inner side, the length of said latter side from the center of said pivot to the center of said button being of a predetermined standard length, the circumferential periphery of said button extending somewhat beyond the innermost dimension of said inner side and serving as a contact for any gage blocks which might be inserted between said bar base and said button, indicator holding means disposed on and along the length of said outer side in a manner so as to engage an indicator anywhere thereon, at least two indicators having measuring tips capable of protruding substantially at right angles to and beyond said outer side, said indicators being mounted in said holding means, and a hardened block mounted on the outermost edge of the outer side and adapted to be banked against a gage block of fixed length when said outer side is extended to horizontal for zeroing, the outer edge of said hardened block being disposed exactly the same distance away from a line extending radially of the pivot and parallel to the contact face of the block as is the bottom of said base bar less the distance of said latter gage block.

2. A sine square device according to claim 1 in which the protractor is one of a series of protractors having accurate angles from 0° to 135°.

References Cited in the file of this patent

UNITED STATES PATENTS

| | | |
|---|---|---|
| 2,369,645 | Bigarani | Feb. 20, 1945 |
| 2,398,121 | Silvermaster | Apr. 9, 1946 |
| 2,451,588 | Teclu | Oct. 19, 1948 |
| 2,787,838 | Tucker | Apr. 9, 1957 |

FOREIGN PATENTS

| | | |
|---|---|---|
| 603,608 | Germany | Oct. 4, 1934 |

OTHER REFERENCES

Machinery, page 591, April 1924, Die-Tru Instruments, Inc. (Cat.) Royal Oak, Michigan.